No. 784,230. Patented March 7, 1905.

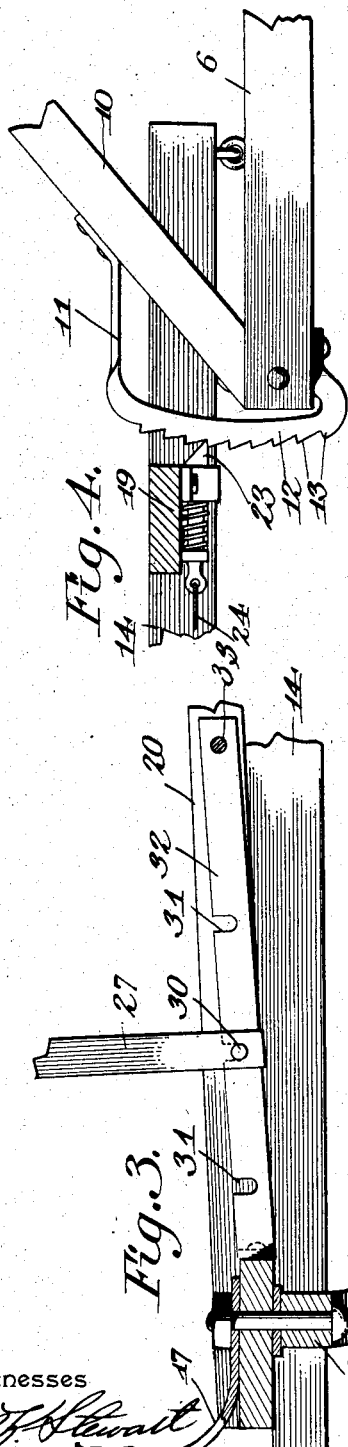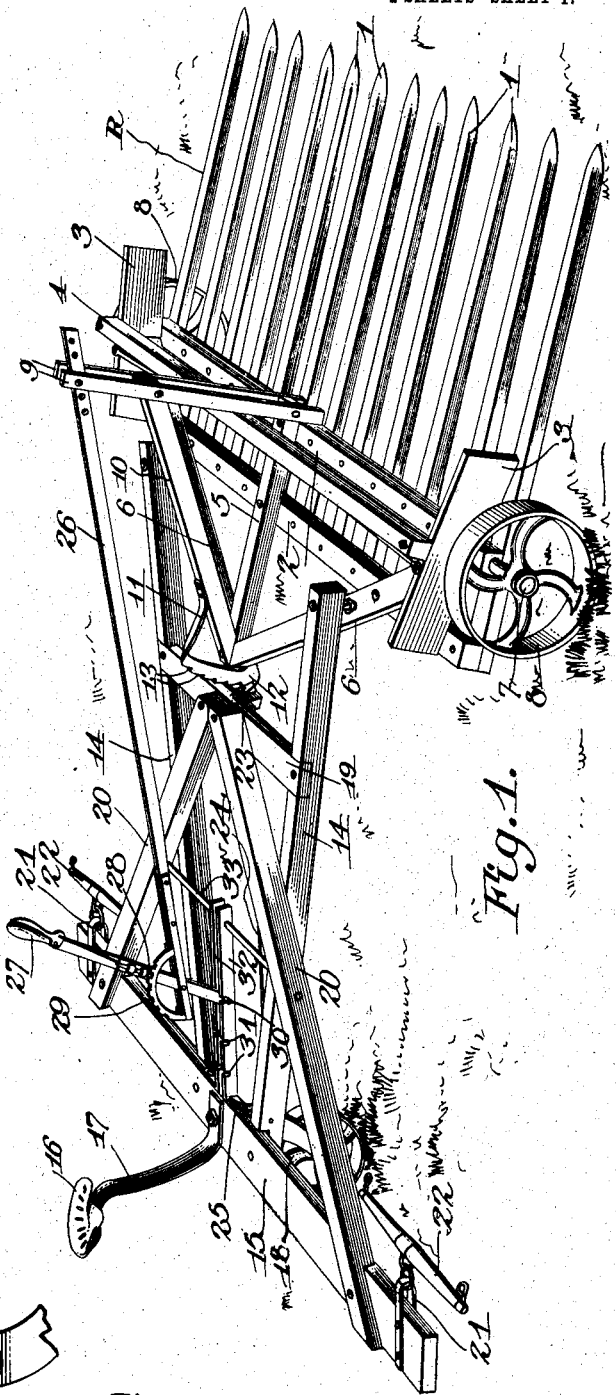

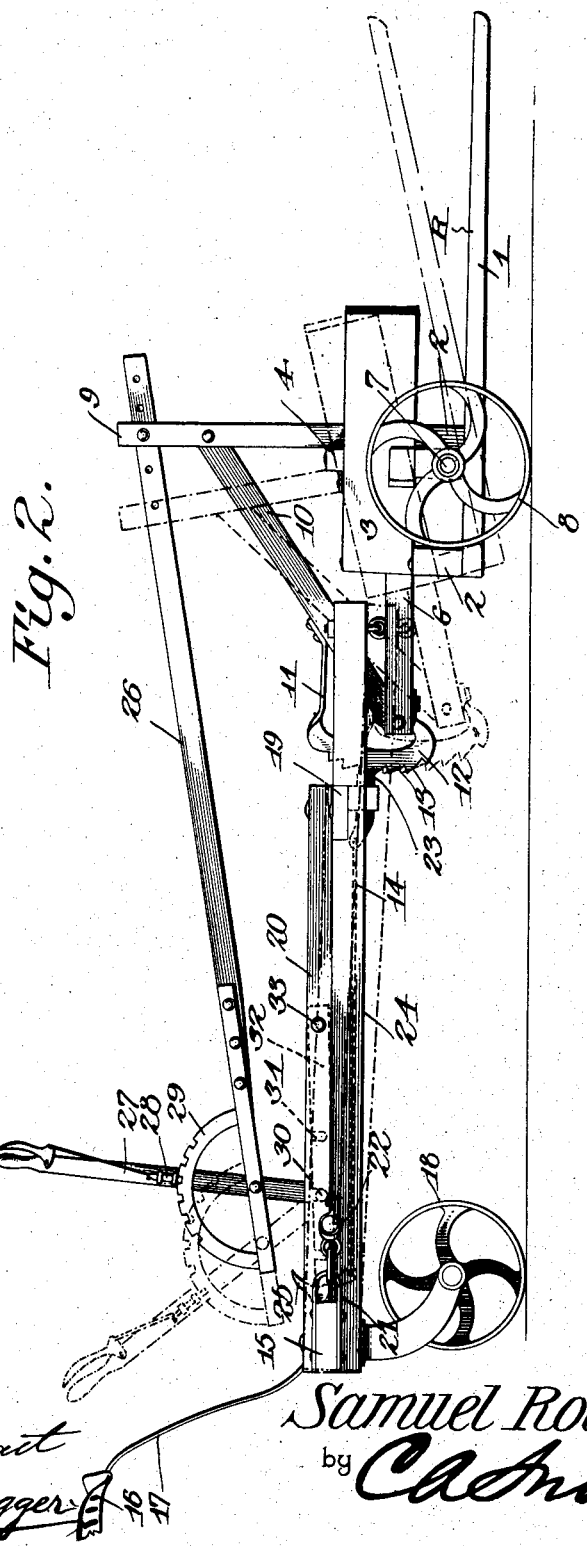

UNITED STATES PATENT OFFICE.

SAMUEL ROTH, OF WINNEMUCCA, NEVADA.

HAY-RAKE.

SPECIFICATION forming part of Letters Patent No. 784,230, dated March 7, 1905.

Application filed October 31, 1904. Serial No. 230,786.

*To all whom it may concern:*

Be it known that I, SAMUEL ROTH, a citizen of the United States, residing at Winnemucca, in the county of Humboldt and State of Nevada, have invented a new and useful Hay-Rake, of which the following is a specification.

This invention relates to horse hay-rakes of that class which are principally employed for the purpose of gathering the hay and conveying the same to the stacker; and the object of the invention is to simplify and improve the construction of this class of devices to enable the rake-head to be readily tilted and to provide means whereby it may be safely retained in adjusted position.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a perspective view of a hay-rake constructed in accordance with the principles of the invention. Fig. 2 is a side elevation of the same. Fig. 3 is a detail view of a portion of the adjusting mechanism. Fig. 4 is a detail view of the means for retaining the rake-head in adjusted position.

Corresponding parts in the several figures are indicated by like characters of reference.

The rake-head of the improved device, which as a whole is designated R, is composed of a plurality of teeth 1 1, connected at their rear ends with cross-bars 2 2, supporting the end blocks 3 3, which are connected by means of a cross-bar 4, supported upon their upper edges. A longitudinal bar 5 is supported centrally upon the cross-bars 2 2, said longitudinal bar being extended rearwardly and the rear end of said bar being connected by obliquely-disposed braces 6 6 with the ends of the cross-bars 2 2. The forward cross-bar 2 is provided with spindles 7, upon which the transporting-wheels 8 are journaled. The longitudinal bar 5 is extended a short distance in front of the front cross-bar 2, and to the sides thereof are secured upwardly-extending side members 9 9, combining to form an upright, which is connected, by means of an inclined brace 10, with the rear end of the longitudinal bar 5. Secured partly to the latter and partly to the inclined brace 10 is a bracket 11, having a curved rear portion 12, provided with a plurality of ratchet-teeth 13 upon its rear edge.

The frame of the rake includes a pair of rearwardly-converging side members 14 14, hingedly connected at their front ends with the obliquely-disposed braces 6 of the rake-head. The rear ends of the side members 14 are connected by and firmly secured to a cross-bar 15, which carries a seat 16, the latter being supported upon a spring-bar 17. The cross-bar 15 is supported upon a swiveled caster-wheel 18. The side members 14 are connected a short distance in rear of the rake-head by a cross-bar 19, which in turn is connected with the rear cross-bar 15 by means of obliquely-disposed braces 20, the rear ends of which latter are connected with the cross-bar 15 near the ends of said cross-bar. Attached to the ends of the cross-bar 15 by means of suitable clevises 21 are whiffletrees 22 for attachment of the draft. Connected with the under side of the cross-bar 19 is a spring-actuated latch member 23, engaging the curved ratchet-bar 12, said latch member being connected, by means of an operating-rod 24, with a foot-lever 25, by means of which it may be conveniently operated to disengage it from the ratchet-bar.

Pivotally mounted between the upper ends of the side members 9, constituting the upright upon the rake-head, is a connecting-rod 26, the rear end of which is pivotally connected with a hand-lever 27, provided with a dog or pawl 28, adapted to engage a rack-segment 29 upon the rear end of the connecting-rod. The hand-lever 27 is provided near its lower end with a transversely-disposed pin 30, adapted to engage any one pair of a plurality of recesses 31 formed in a pair of bars 32, the rear ends of which are attached to the front side of the cross-bar 15 and the front ends of which are supported by a rod 33, extending transversely through said notched bars and connected with the braces 20.

It will be seen that by properly adjusting and manipulating the hand-lever 27 the rake-head may be tilted so as to bring the points of the teeth either downwardly or upwardly, as may be desired. When the rake is to be used for gathering hay, the fulcrum-pin of the rake is adjusted in the forward notches 31, the latch 23 is disengaged from the ratchet-bar 12, and the handle end of the lever is then moved in a forward direction, thus tilting the upright members 9 forwardly and depressing the rake-teeth, which are retained in a depressed position partly by their own weight and partly by placing the dog 28 of the hand-lever in engagement with the rack-segment 29. When a load has been gathered, the points of the rake-teeth may be tilted upward by moving the handle end of the lever 27 in a rearward direction. The curved ratchet-bar 12 will slide over the spring-actuated latch 23 and will be retained by the latter, while the fulcrum-pin of the hand-lever is shifted to a position farther toward the rear, thus enabling the said hand-lever to be utilized for the purpose of tilting the rake-head to any desired extent, so that the load may be carried conveniently over the ground. When the place of deposit has been reached, the foot-lever or treadle 25 is operated to release the latch member 23 from the ratchet-bar 12, thus causing the points of the rake-teeth to drop, so that the rake may be backed from under the load.

Having thus described the invention, what is claimed is—

1. A tilting wheel-supported rake-head having upright members, a rearwardly-extending longitudinal bar and braces connecting the latter with the ends of the rake-head and with the upright member, and a curved ratchet-bar positioned in rear of the longitudinal bar, in combination with a frame having side members hingedly connected with the rake-head, rotary supporting means for the rear end of said frame, a latch member upon said frame engaging the ratchet-bar connected with the rake-head, and means for tilting the latter.

2. A tilting wheel-supported rake-head having upright members and provided with a curved ratchet-bar, a frame having side members connected hingedly with the rake-head, rotary supporting means for the rear end of said frame, a latch connected with the latter and engaging the ratchet-bar, a hand-lever having a transversely-disposed fulcrum-pin, a pair of bars connected with the frame and provided with a plurality of notches for the fulcrum-pin of the lever, and connecting means between the latter and the upright members upon the rake-head.

3. In a hay-rake, a tilting, wheel-supported rake-head having an upright, a frame hingedly connected with said rake-head, a ratchet-bar upon the rake-head, a latch upon the frame engaging said ratchet-bar, means for operating the latch, and means for tilting the rake-head.

4. In a hay-rake, a tilting, wheel-supported rake-head having an upright, a frame hingedly connected with said rake-head, rotary supporting means for said frame, a ratchet-bar upon the rake-head, a latch upon the frame engaging said ratchet-bar, a hand-lever having a shiftable fulcrum upon the frame, and connecting means between said lever and the upright upon the rake-head.

5. In a hay-rake, a tilting, wheel-supported rake-head having an upright and a ratchet-bar, a frame hingedly connected with said rake-head and having a spring-latch engaging said ratchet-bar, means for operating said latch, a hand-lever having a shiftable fulcrum upon the frame, a rod pivotally connecting said lever with the upright upon the rake-head, a segment-rack upon the connecting-rod, and a dog upon the hand-lever engaging said segment-rack.

In testimony that I claim the foregoing as my own I have hereto affixed my signature in the presence of two witnesses.

SAMUEL ROTH.

Witnesses:
 J. W. GUTHRIE,
 P. B. ROBERTS.